United States Patent
Lim

(10) Patent No.: US 9,886,911 B2
(45) Date of Patent: Feb. 6, 2018

(54) DISPLAY APPARATUS AND METHOD FOR DRIVING LIGHT SOURCE THEREOF

(71) Applicant: Samsung Electronics Co., Ltd., Suwon-si (KR)

(72) Inventor: Dae-sung Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 128 days.

(21) Appl. No.: 14/962,171

(22) Filed: Dec. 8, 2015

(65) Prior Publication Data
US 2016/0189633 A1    Jun. 30, 2016

(30) Foreign Application Priority Data
Dec. 31, 2014  (KR) .......... 10-2014-0195516

(51) Int. Cl.
*G09G 3/34* (2006.01)
*H04N 13/04* (2006.01)
*G09G 3/20* (2006.01)

(52) U.S. Cl.
CPC ......... *G09G 3/3406* (2013.01); *G09G 3/2014* (2013.01); *H04N 13/0411* (2013.01); *H04N 13/0418* (2013.01); *H04N 13/0452* (2013.01); *H04N 13/0497* (2013.01); *G09G 2320/0646* (2013.01)

(58) Field of Classification Search
CPC .............. G09G 3/3406; G09G 3/2014; G09G 2320/0646; H04N 13/0402; H04N 13/0422; H04N 13/0497
See application file for complete search history.

(56) References Cited

U.S. PATENT DOCUMENTS

2005/0083516 A1* 4/2005 Baker ................. G02B 27/225
                                                     356/124
2011/0115889 A1* 5/2011 Kim ..................... G09G 3/003
                                                     348/56

\* cited by examiner

*Primary Examiner* — Shaheda Abdin
(74) *Attorney, Agent, or Firm* — Staas & Halsey LLP

(57) ABSTRACT

An autostereoscopic 3D display apparatus, and a light source driving method thereof, includes an image receiver configured to receive an image, an image analyzer configured to analyze the image input through the image receiver, a 2D light source configured to generate a 2D image, a 3D light source configured to generate a 3D image, and a controller configured to drive the 2D light source and the 3D light source based on a result analyzed through the image analyzer in response to the display apparatus being operated in a 2D mode.

14 Claims, 10 Drawing Sheets

DISPLAY APPARATUS AND METHOD FOR DRIVING LIGHT SOURCE THEREOF

CROSS-REFERENCE TO RELATED APPLICATIONS

This application claims priority from Korean Patent Application No. 10-2014-0195516, filed on Dec. 31, 2014, in the Korean Intellectual Property Office, the disclosure of which is incorporated herein by reference in its entirety.

BACKGROUND

1. Field

The following description relates to an autostereoscopic three-dimensional (3D) display apparatus and a method for driving a light source thereof, and more particularly, to an autostereoscopic 3D display apparatus which drives both a 2D light source and a 3D light source in a 2D mode operation, and a method for driving a light source thereof.

2. Description of the Related Art

Due to the technology development, image display apparatuses which display more realistic images are needed. High-resolution image display apparatuses with increased pixels for image display have been developed, and 3D display apparatuses capable of three-dimensionally displaying images have been further developed. The 3D display apparatuses implement 3D stereoscopic images using binocular parallax due to a distance between two eyes of the user, and the like. The current 3D display apparatuses may be employed in a television (TV) as well as in various fields, such as medical images, games, advertisements, educations, or militaries, and more effects due to a 3D effect may be expected.

The 3D display apparatuses are divided into stereoscopic 3D display apparatuses and autostereoscopic 3D display apparatuses. The stereoscopic 3D display apparatuses are divided into a polarization type and a shutter type. The autostereoscopic 3D display apparatuses, which acquire 3D images by dividing a left-eye image and a right-eye image without glasses, are divided into a parallax barrier type, a lenticular type, an integral image type, and a holography type.

The stereoscopic 3D display apparatuses have traditionally been commercially used, but the stereoscopic 3D display apparatuses have the disadvantages of wearing glasses, causing eye fatigue, and using additional structure (for example, glasses). In recent years, autostereoscopic 3D display apparatuses have been developed.

Even in the autostereoscopic 3D display apparatuses, because the user does not view a 3D stereoscopic image all the time, and the user occasionally views a 2D image, the development of display apparatuses which display both the 2D image and the 3D image are proceeding. In the autostereoscopic 3D display apparatuses capable of displaying both a 2D image and a 3D image in the related art, a light source configured to generate the 2D image and a light source configured to generate the 3D image are separated. In a mode which displays a 2D image through the autostereoscopic 3D display apparatus (hereinafter, referred to as a "2D mode"), the light source configured to generate the 3D image is turned off. Thus, in the 2D mode operation, a regular pattern is recognized in a region in which the light source configured to generate the 3D image is located and degradation in picture quality is caused.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to an autostereoscopic 3D display apparatus which drives both light sources configured to generate a 2D image and a 3D image through analysis of an input image to prevent picture quality from being degraded in a region in which the light source configured to generate the 3D image is located in a 2D mode operation, and a method for driving a light source thereof.

According to an aspect of an exemplary embodiment, an autostereoscopic three-dimensional (3D) display apparatus includes an image receiver configured to receive an image; an image analyzer configured to analyze the image input through the image receiver; a 2D light source configured to generate a 2D image; a 3D light source configured to generate a 3D image; and a controller configured to drive the 2D light source and the 3D light source based on a result analyzed through the image analyzer in response to the display apparatus being operated in a 2D mode.

The controller may include a 2D light source controller configured to control the 2D light source and a 3D light source controller configured to control the 3D light source. The image analyzer may calculate a pulse width modulation (PWM) value of the 3D light source through average brightness or histogram analysis of the input image in the 2D mode operation, and the 3D light source controller may drive the 3D light source based on the PWM value of the 3D light source calculated through the image analyzer in the 2D mode operation.

The image analyzer may control the PWM value based on a brightness ratio of the 2D light source and the 3D light source in the 2D mode operation.

The image analyzer may calculate PWM values of the 3D light source according to regions by analyzing brightness values of the input image according to the regions in the 2D mode operation, and the 3D light source controller may drive the 3D light source according to the regions based on the PWM values of the 3D light source according to the regions calculated through the image analyzer in the 2D mode operation.

The image analyzer may output a PWM value in which a brightness value output from the 2D light source is a minimum value to the 2D light source controller in response to the display apparatus being operated in a 3D mode, and the 2D light source controller may drive the 2D light source based on the PWM value in which the brightness value output from the 2D light source is the minimum value in response to the display apparatus being operated in the 3D mode.

The image analyzer may control, in response to only a partial region of the display apparatus being operated in a 3D mode, a PWM value for the partial region and a PWM value for the remaining region other than the partial region to be different from each other. The 3D light source controller may drive the 3D light source based on the PWM value for the partial region and the PWM value for the remaining region.

The controller may acquire brightness parameter information set by a user, and drive the 2D light source and the 3D light source based on the result analyzed through the image analyzer and the brightness parameter information.

The 3D light source may include a vertical light source and the 2D light source may include a horizontal light source or a direct light source.

According to an aspect of an exemplary embodiment, a method for driving a light source of an autostereoscopic three-dimensional (3D) display apparatus, including a 2D light source configured to generate a 2D image and a 3D light source configured to generate a 3D image, includes receiving an image; analyzing the input image; and driving the 2D light source and the 3D light source based on an analysis result of the input image in response to the display apparatus being operated in a 2D mode.

The analyzing may include calculating a pulse width modulation (PWM) value of the 3D light source through average brightness or histogram analysis of the input image in the 2D mode operation, and the driving may include driving the 3D light source based on the PWM value of the 3D light source in the 2D mode operation.

The analyzing may include controlling the PWM value based on a brightness ratio of the 2D light source and the 3D light source in the 2D mode operation.

The analyzing may include calculating PWM values of the 3D light source according to regions by analyzing brightness values of the input image according to the regions in the 2D mode operation, and the driving may include driving the 3D light source according to the regions based on the PWM values of the 3D light source according to the regions in the 2D mode operation.

The analyzing may include calculating a PWM value in which a brightness value output from the 2D light source is a minimum value in response to the display apparatus being operated in a 3D mode, and the driving may include driving the 2D light source based on the PWM value in which the brightness value output from the 2D light source is the minimum value in response to the display apparatus being operated in the 3D mode.

The analyzing may include, in response to only a partial region of the display apparatus being operated in a 3D mode, controlling a PWM value for the partial region and a PWM value for the remaining region other than the partial region to be different from each other. The driving may include driving the 3D light source based on the PWM value for the partial region and the PWM value for the remaining region.

The method may further including acquiring brightness parameter information set by a user, and the driving may include driving the 2D light source and the 3D light source based on the analysis result and the brightness parameter information.

The 3D light source may include a vertical light source and the 2D light source may include a horizontal light source or a direct light source.

According to various exemplary embodiments, in response to an autostereoscopic 3D display apparatus being operated in a 2D mode, pattern recognition in a region in which a light source configured to generate a 3D image is located may be prevented.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1A:
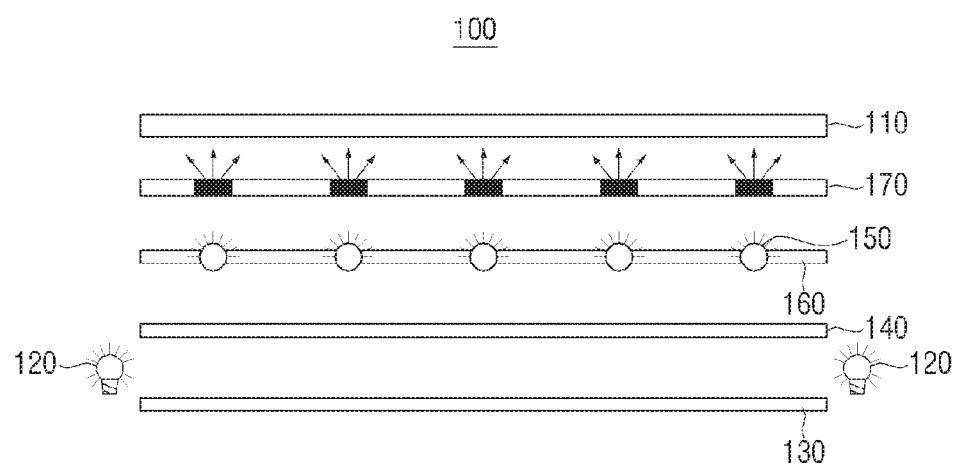
FIG. 1A is a cross-sectional view illustrating a display module included in an autostereoscopic 3D display apparatus capable of displaying both a 2D image and a 3D image according to an exemplary embodiment.

Reference will now be made in detail to the embodiments, examples of which are illustrated in the accompanying drawings, wherein like reference numerals refer to like elements throughout. The embodiments are described below to explain the present disclosure by referring to the figures.

Exemplary embodiments are described herein with reference to cross-sectional illustrations that are schematic illustrations of exemplary embodiments (and intermediate structures). Thus, exemplary embodiments should not be construed as limited to the particular shapes of regions illustrated herein. These inventive concepts may, however, be embodied in different forms and it will be appreciated by those of ordinary skill in the art that changes may be made in these exemplary embodiments without departing from the principles and spirit of the inventive concept, the scope of which is defined by the claims and their equivalents. Also, well-known functions or constructions are not described in detail because they would obscure the disclosure with unnecessary detail.

It will be understood that, although the terms first, second, etc. may be used herein in reference to elements of the disclosure, such elements should not be construed as limited by these terms. The terms are used only to distinguish one element from other elements.

The terminology used herein to describe embodiments of the disclosure is not intended to limit the scope of the disclosure. The articles "a," "an," and "the" are singular in that they have a single referent; however, the use of the singular form in the present document should not preclude the presence of more than one referent. In other words, elements of the disclosure referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In exemplary embodiments, "module" or "unit" may perform at least one function or operation, and may be implemented with hardware, software, or a combination thereof. "Plurality of modules" or "plurality of units" may be implemented with at least one processor (not shown)

through integration thereof with at least one module other than "module" or "unit" which is implemented with specific hardware.

Hereinafter, exemplary embodiments will be described with reference to the accompanying drawings in detail. FIG. 1A is a cross-sectional view illustrating a display module 100 included in an autostereoscopic 3D display apparatus capable of displaying both a 2D image and a 3D image according to an exemplary embodiment. As illustrated in FIG. 1A, the display module 100 may include a liquid crystal display (LCD) panel 110, a 2D light source 120, a first light guide plate 130, a diffusion plate 140, a 3D light source 150, a second light guide plate 160, and a viewing area separator 170.

Although not shown in FIG. 1A, the LCD panel 110 may include a lower substrate in which thin film transistors (TFTs) and pixel electrodes are arranged, an upper substrate configured of a color filter for representing color and a common electrode, and a LC layer interposed between the two substrates.

The 2D light source 120 may be a light source configured to generate a 2D image and may be disposed below the LCD panel 110. The 2D light source 120 may be implemented with a light emitting diode (LED) or a cold cathode fluorescent lamp, but the 2D light source is not limited thereto.

Figure 1B:
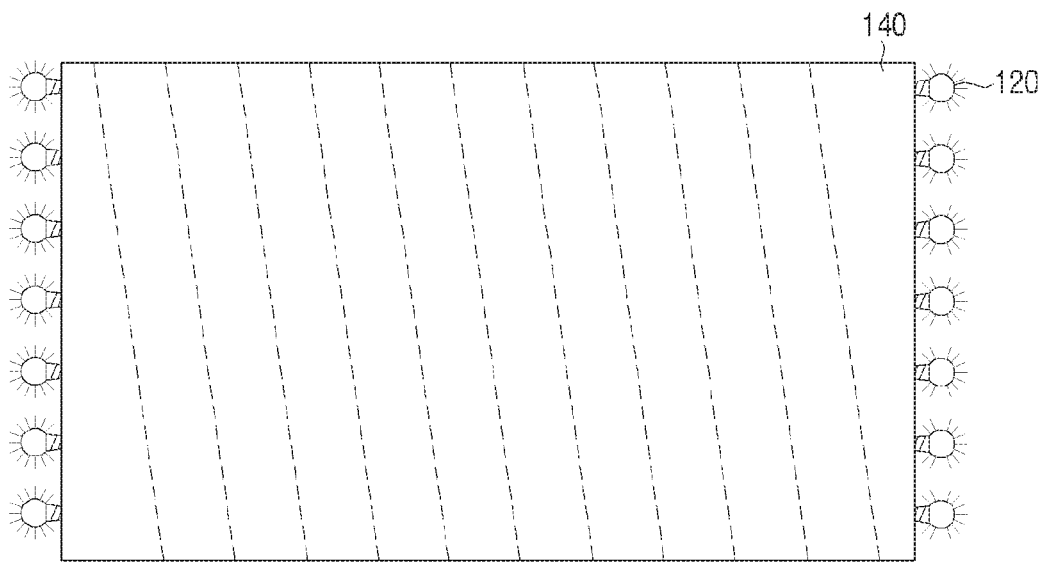
FIG. 1B is a diagram illustrating a 2D light source according to an exemplary embodiment.

The first light guide plate 130 may be configured to guide light emitted from the 2D light source to the LCD panel 110, and a scattering pattern configured to scatter light in response to the light may be engraved or embossed in a front side or a rear side thereof. For example, the 2D light source 120 may be located in a side region of the diffusion plate 140 as illustrated in FIG. 1B, but this is merely exemplary. The 2D light source 120 may be disposed in a direct manner.

The diffusion plate 140 may be located above the first light guide plate 130 and be configured to cause color and brightness to be uniformly viewed in an entire screen by diffusing light emitted from the 2D light source 120 along a surface thereof.

Figure 1C:
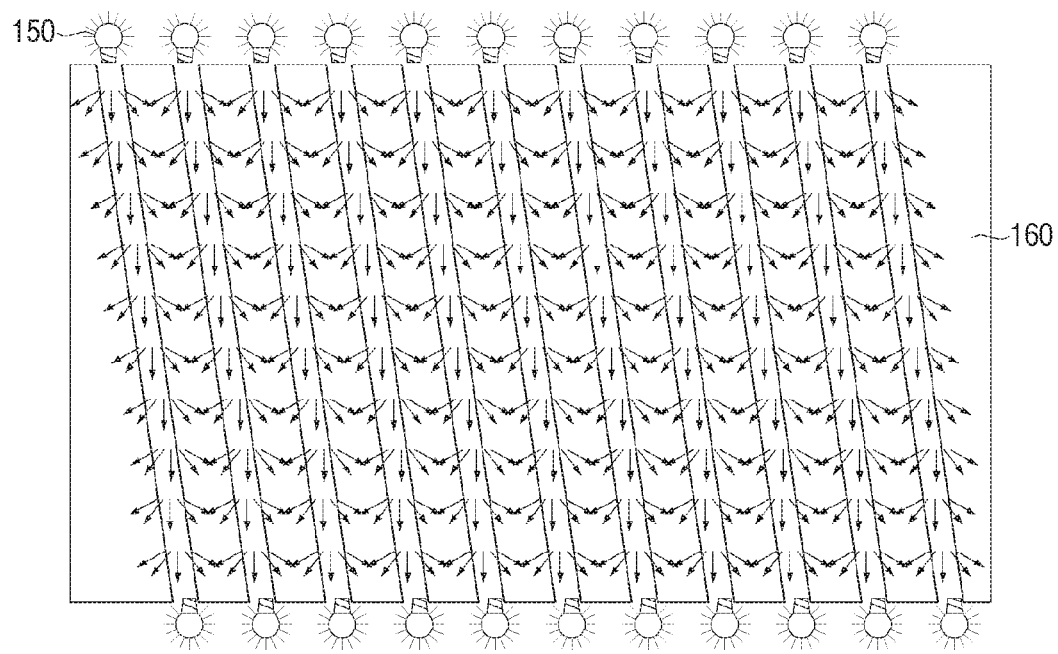
FIG. 1C is a diagram illustrating a 3D light source according to an exemplary embodiment.

The 3D light source 150 may be a light source configured to generate a 3D image, and may be disposed between the LCD panel 110 and the 2D light source 120. The 3D light source 150 may be implemented with a LED or a cold cathode fluorescent lamp, but the 3D light source is not limited thereto. For example, the 3D light source 150 may be located on an upper and lower regions of the second light guide plate 160 as illustrated in FIG. 1C.

The second light guide plate 160 may be configured to be disposed between the LCD panel 110 and the diffusion plate 140 to generate the 3D image, and may guide the light emitted from the 3D light source 150 to the LCD panel 110. The second light guide plate 160 may be implemented in a plate form as illustrated in FIG. 10, but this is merely exemplary. The second light guide plate 160 may be implemented in a stripe form.

The viewing area separator 170 may be disposed between the LCD panel 110 and the second light guide plate 160, and a mask pattern configured to block the light scattered from the second light guide plate 160 may be formed in the viewing area separator 170. The viewing area separator 170 may generate a 3D effect for the input image through the mask pattern. The viewing area separator 170 may be implemented with a parallax barrier, but the viewing area separator 170 is not limited thereto. The viewing area separator 170 may be implemented with a configuration such as a lenticular lens sheet.

As described above, the viewer may view the 2D image and the 3D image through one display apparatus including the display module 100 illustrated in FIG. 1A. The configuration of the display module illustrated in FIG. 1A is merely exemplary, and specific components may be omitted or added according to the implementation type of the autostereoscopic 3D display apparatus.

As illustrated in FIG. 1A, the configuration for generating the 3D image (the 3D light source 150, the second light guide plate 160, and the viewing area separator 170) may be disposed between the LCD panel 110 and the configuration for generating the 2D image (the 2D light source 120, the first light guide plate 130, and the diffusion plate 140), but this is merely exemplary. The configuration for generating the 2D image may be disposed between the LCD panel 110 and the configuration for generating the 3D image. The diffusion plate may be masked to pass the light for generating the 3D image through so that the light for generating the 3D image may be emitted to the LCD panel.

As described above, in response to the autostereoscopic 3D display apparatus being operated in the 2D mode, a degradation in picture quality that the specific pattern formed by the 3D light source 150 and the second light guide plate 160 is displayed in the 2D image may be caused. Hereinafter, a method of removing the degradation in picture quality caused in the 2D mode operation will be described with reference to FIGS. 2 to 6.

Figure 2:
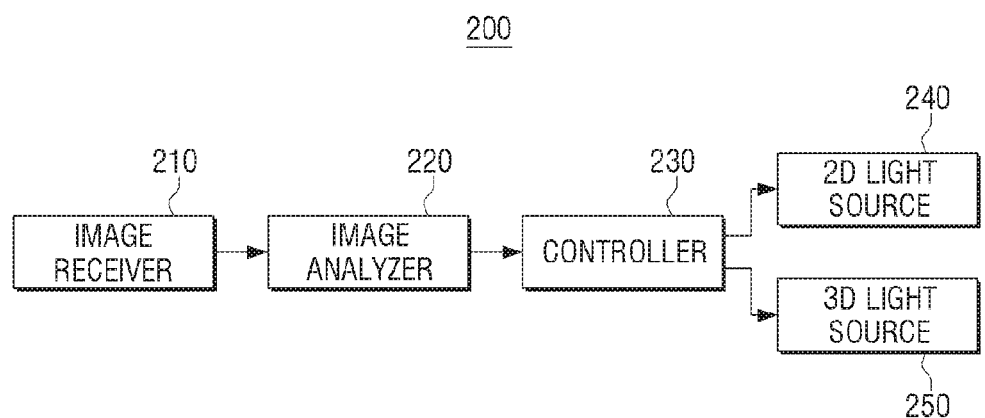
FIG. 2 is a schematic block diagram illustrating a configuration of an autostereoscopic 3D display apparatus according to an exemplary embodiment.

FIG. 2 is a schematic block diagram illustrating a configuration of an autostereoscopic 3D display apparatus 200 according to an exemplary embodiment. As illustrated in FIG. 2, the autostereoscopic 3D display apparatus 200 may include an image receiver 210, an image analyzer 220, a 2D light source 240, a 3D light source 250, and a controller 230. For example, the 3D display apparatus 200 may be a smart TV, but this is merely exemplary. The 3D display apparatus 200 may be implemented with various electronic apparatuses such as a general digital TV, a desktop personal computer (PC), or a kiosk.

The image receiver 210 may receive an image from an external source. For example, the image receiver 210 may receive a broadcast image through a tuner (not shown). In another example, the image receiver 210 may receive a video on demand (VOD) image through a communication unit (not shown) or may receive a pre-stored image.

The image analyzer 220 may analyze the image input through the image receiver 210. For example, the image analyzer 220 may analyze a type, average brightness of total pixels, a histogram, and brightness according to a region of the input image, and the like. The image analyzer 220 may calculate PWM values of the 2D light source 240 and the 3D light source 250 based on the analysis result.

The 2D light source 240 may be a light source configured to generate a 2D image, and as illustrated in FIG. 1B, the 2D light source 240 may be disposed in left and right regions of the diffusion plate 140 or a region directly under the diffusion plate 140.

The 3D light source 250 may be a light source configured to generate a 3D image, and as illustrated in FIG. 10, the 3D light source 250 may be disposed in a top and bottom regions of the second light guide plate 160.

The controller 230 may drive at least one of the 2D light source 240 and the 3D light source 250 based on the image analysis result of the image analyzer 220.

For example, in response to the 3D display apparatus 200 being operated in the 2D mode, the controller 230 may drive both the 2D light source 240 and the 3D light source 250 based on the image analysis result of the image analyzer 220. That is, to prevent the degradation in picture quality caused in response to the 3D display apparatus 200 being operated in the 2D mode, the controller 230 may drive both the 2D light source 240 and the 3D light source 250 based on the PWM value of the 2D light source 240 and the PWM value of the 3D light source 250 which are calculated based on the image analysis result. In this example, the controller 230 may synchronize the 3D light source 250 with the 2D light source 240 by controlling the PWM value of the 3D light source 250 so that the user may not recognize the pattern generated due to the 3D light source 250.

The controller 230 may drive only the 3D light source located in a specific region through local dimming based on the image analysis result of the image analyzer 220.

The controller 230 may acquire brightness parameter information set by the user, and drive the 2D light source 240 and the 3D light source 250 based on the result analyzed through the image analyzer 220 and the brightness parameter information. For example, in response to an entire screen being set to be brightly displayed by the user, the controller 230 may control the 2D light source 240 and the 3D light source 250 to cause the entire screen to be bright. In response to the entire screen being set to be dimly displayed by the user, the controller 230 may control the 2D light source 240 and the 3D light source 250 to cause the entire screen to be dim.

In response to the 3D display apparatus 200 being operated in the 3D mode, the controller 230 may drive the 3D light source 250 based on the PWM value of the 3D light source 250 generated based on the image analysis result of the image analyzer 220, and the controller 230 may turn off the 2D light source 240 or may drive the 2D light source 240 at minimum brightness.

Through the above-described 3D display apparatus 200, the degradation in picture quality, which is caused by the 3D light source 250 and the second light guide plate 160 in the 2D mode operation, may be removed.

Figure 3:
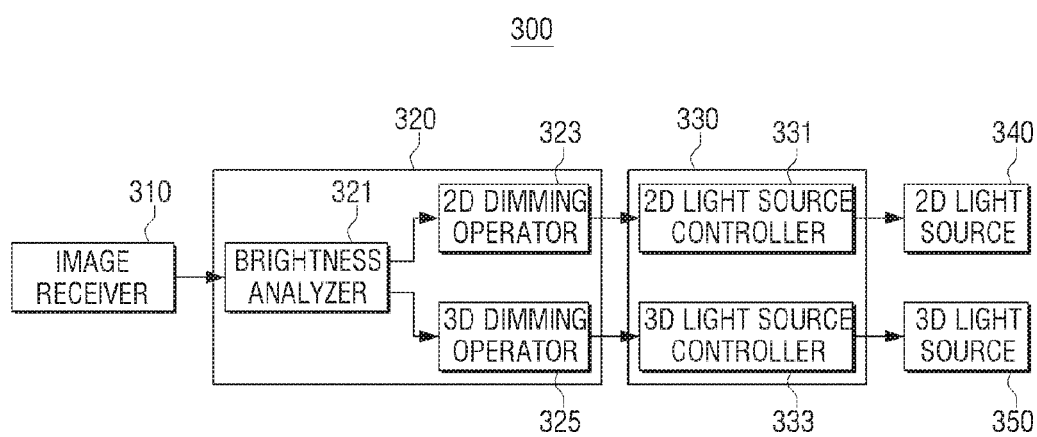
FIG. 3 is a detailed block diagram illustrating a configuration of an autostereoscopic 3D display apparatus according to an exemplary embodiment.

Hereinafter, exemplary embodiments will be described in more detail with reference to FIGS. 3 to 6. FIG. 3 is a detailed block diagram illustrating a configuration of an autostereoscopic 3D display apparatus 300 according to an exemplary embodiment. As illustrated in FIG. 3, the autostereoscopic 3D display apparatus 300 may include an image receiver 310, an image analyzer 320, a 2D light source 340, a 3D light source 350, and a controller 330.

The image receiver 310 may receive an image from an external source. For example, the image receiver 310 may receive a broadcast image through a tuner (not shown). In another example, the image receiver 310 may receive a VOD image through a communication unit (not shown) or may receive a pre-stored image. In another example, the image receiver 310 may receive a user interface (UI) image generated through the 3D display apparatus 300.

The image analyzer 320 may calculate PWM values of the second light source 340 and the 3D light source 350 by analyzing the image input through the image receiver 310. For example, the image analyzer 320 may include a brightness analyzer 321, a 2D dimming operator 323, and a 3D dimming operator 325.

The brightness analyzer 321 may analyze brightness information of the input image. For example, the brightness analyzer 321 may analyze entire average brightness, a histogram, and brightness according to a region of the input image, and the like.

The 2D dimming operator 323 may calculate the PWM value of the 2D light source 340 based on the brightness analysis result of the brightness analyzer 321. For example, in the 2D mode operation, the 2D dimming operator 323 may calculate the PWM value of the 2D light source 340 corresponding to the brightness of the input image. In the 3D mode operation, the 2D dimming operator 323 may not calculate the PWM value of the 2D light source 340 or may calculate the PWM value of the 2D light source 340 to have minimum brightness.

The 3D dimming operator 325 may calculate the PWM value of the 3D light source 350 based on the brightness analysis result of the brightness analyzer 321. For example, in the 3D mode operation, the 3D dimming operator 325 may calculate the PWM value of the 3D light source 350 corresponding to the brightness of the input image. In the 2D mode operation, the 3D dimming operator 325 may calculate the PWM value of the 3D light source 350 based on the brightness analysis result of the brightness analyzer 321.

In the 2D mode operation, the 3D dimming operator 325 may control the PWM value of the 3D light source 350 based on a brightness ratio of the 2D light source 340 and the 3D light source 350. For example, the brightness ratio of the 2D light source 340 and the 3D light source 350 may not be the same as 1:1. In this example, the 3D dimming operator 325 may synchronize the brightness of the 3D light source 350 with the brightness of the 2D light source 340 at an optimum ratio so that light emitted from the 3D light source 350 may not be distinguished from the 2D image generated by light emitted from the 2D light source 340. That is, the 3D dimming operator 325 may calculate the PWM value of the 3D light source 350 so that the brightness of the 3D light source 350 may be synchronized with the brightness of the 2D light source 340 at the optimum ratio. The 3D dimming operator 325 may control the brightness of the 2D light source 340 and the brightness of the 3D light source 350 by widening or narrowing widths of the PWMs.

In the 2D mode operation, the 3D dimming operation 325 may calculate PWMs value of the 3D light source 350 according to regions by analyzing brightness values of the input image according to the regions.

Figure 4:
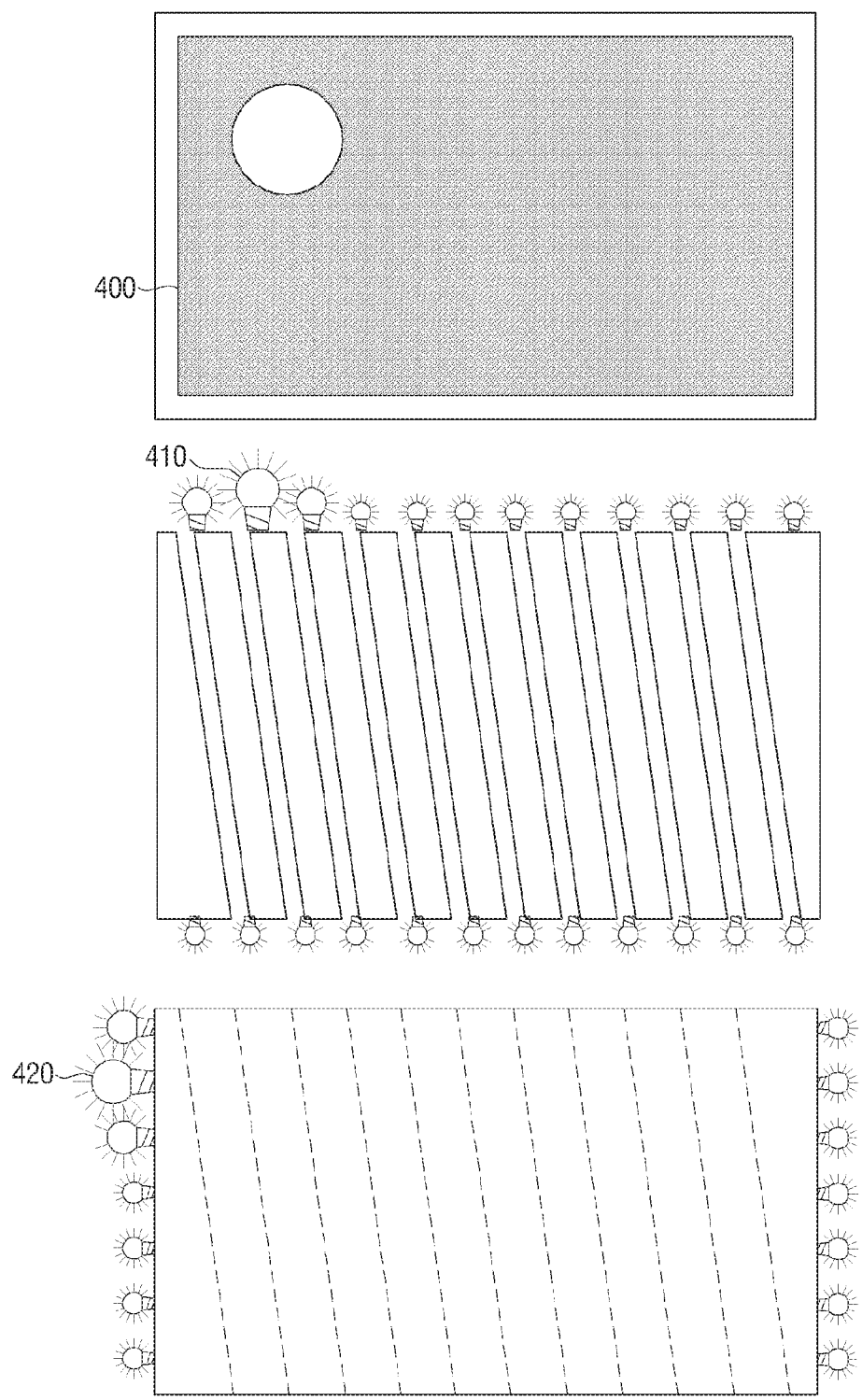
FIGS. 4, 5, and 6 are diagrams illustrating methods for driving a 2D light source and a 3D light source in a 2D mode operation according to an exemplary embodiment.

For example, in response to only an upper left portion of an input image 400 being bright as illustrated in a top drawing of FIG. 4, as illustrated in a middle drawing of FIG. 4, the 3D dimming operator 325 may calculate a PWM value of a 3D light source 410 located in a left side of a top, and the 3D dimming operator 325 may not calculate PWM values of 3D light sources located in the remaining region, or may calculate the PWM values of the 3D light sources in the remaining region as a PWM value having minimum brightness. In this example, as illustrated in a bottom drawing of FIG. 4, the 2D dimming operator 323 may calculate a PWM value of a 2D light source 420 located in an upper end of a left side and the 2D dimming operator 323 may not calculate PWM values of 2D light sources located in the remaining region or may calculate the PWM values of the 2D light sources in the remaining region as a PWM value having minimum brightness.

Figure 5:
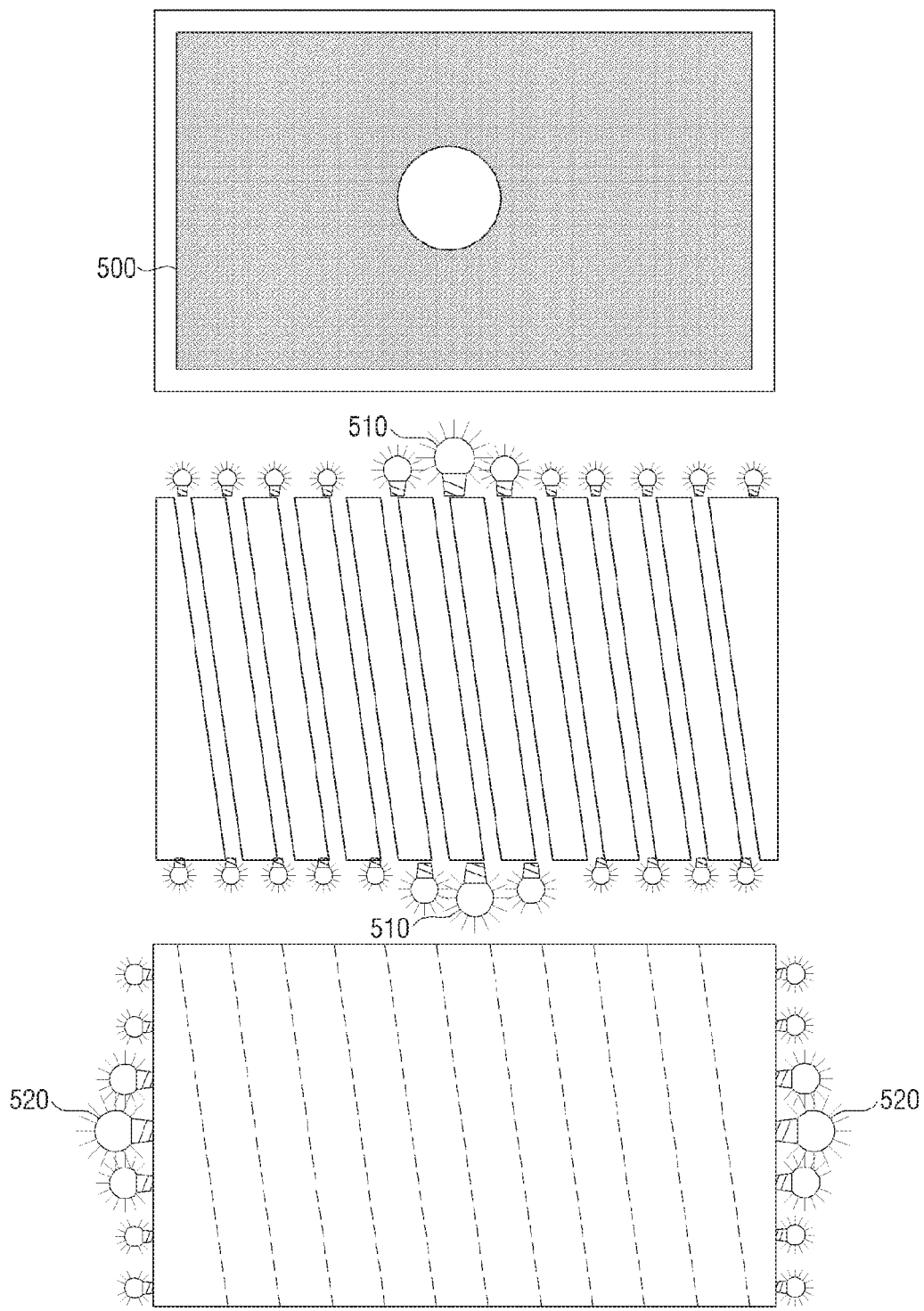

In response to only a center portion of an input image 500 being bright as illustrated in a top drawing of FIG. 5, as illustrated in a middle drawing of FIG. 5, the 3D dimming operator 325 may calculate PWM values of 3D light sources 510 located in center portions of a top and a bottom and the 3D dimming operator 325 may not calculate PWM values of 3D light sources located in the remaining region or may calculate the PWM values of the 3D light sources in the remaining region as a PWM value having minimum brightness. In this example, as illustrated in a bottom drawing of FIG. 5, the 2D dimming operator 323 may calculate PWM values of 2D light sources 520 located in center portions of left and right sides and the 2D dimming operator 323 may not calculate PWM values of 2D light sources located in the remaining region or may calculate the PWM values of the 2D light sources in the remaining region as a PWM value having minimum brightness.

Figure 6:
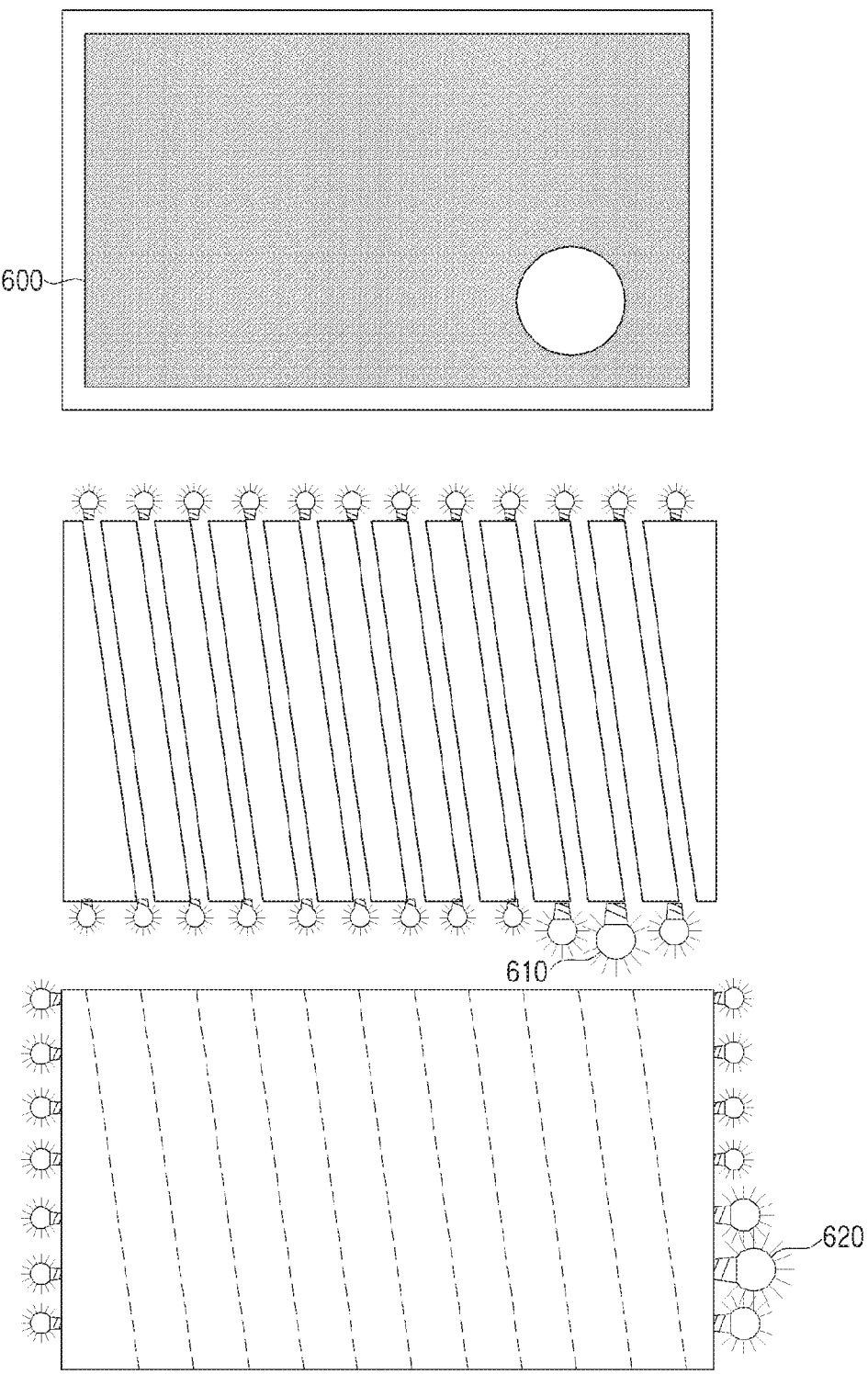

In response to only an bottom right portion of an input image 600 being bright as illustrated in a top drawing of FIG. 6, as illustrated in a middle drawing of FIG. 6, the 3D dimming operator 325 may calculate a PWM value of a 3D light source 610 located in a right side of a bottom, and the 3D dimming operator 325 may not calculate PWM values of 3D light sources located in the remaining region or may calculate the PWM values of the 3D light sources in the remaining region as a PWM value having minimum brightness. In this example, as illustrated in a bottom drawing of FIG. 6, the 2D dimming operator 323 may calculate a PWM value of a 2D light source 620 located in a lower end of a right side and the 2D dimming operator 323 may not calculate PWM values of the 2D light sources located in the remaining region or may calculate the PWM values of the 2D light sources in the remaining region as a PWM value having minimum brightness.

In response to a partial region of the 3D display apparatus being operated in a 3D mode, the 3D dimming operator 325 may control a PWM value of the 3D light source 350 for the partial region and a PWM value of the 3D light source 350 for the remaining region other than the partial region to be different from each other. In this example, the 3D dimming operator 325 may calculate the PWM of the 3D light source 350 corresponding to a brightness value of the input image in the partial region operated in the 3D mode, and the 3D dimming operator 325 may calculate the PWM value of the 3D light source 350 in the remaining region operated in the 2D mode so that brightness of the 3D light source 350 may be synchronized with brightness of the 2D light source 340 at an optimum ratio.

The 2D light source 340 may be a light source configured to generate a 2D image, and may be disposed in the left and right regions of the diffusion plate 140 or in a region directly under the diffusion plate 140 as illustrated in FIG. 1B.

The 3D light source 350 may be a light source configured to generate a 3D image, and may be disposed in the upper and lower regions of the second light guide plate 160 as illustrated in FIG. 10. The 3D light source 350 may perform local dimming capable of individual control according to a region.

The controller 330 may drive the 2D light source 340 and the 3D light source 350 based on the PWM values calculated through the image analyzer 320. The controller 330 may include a 2D light source controller 331 configured to drive the 2D light source 340 and a 3D light source controller 333 configured to drive the 3D light source 350.

The 2D light source controller 331 may control the 2D light source 340 based on the PWM value of the 2D light source 340 output through the 2D dimming operator 323. For example, in the 2D mode operation, the 2D light source controller 331 may drive the 2D light source 340 based on the PWM value corresponding to the brightness of the input image. In the 3D mode operation, the 2D light source controller 331 may not drive the 2D light source 340 or may drive the 2D light source 340 based on the PWM value corresponding to minimum brightness.

The 3D light source controller 333 may drive the 3D light source 350 based on the PWM value of the 3D light source 350 output through the 3D dimming operator 325. For example, in the 3D mode operation, the 3D light source controller 333 may drive the 3D light source 350 based on the PWM value corresponding to the brightness of the input image. In the 2D mode operation, the 3D light source controller 333 may drive the 3D light source 350 based on the calculated PWM value so that light emitted through the 3D light source 350 may not be distinguished from the 2D image generated by light emitted through the 2D light source 340.

In another example, in the 2D mode operation, the 3D light source controller 333 may drive the 3D light source 350 based on different PWM values according to regions through the analysis result of the input image.

In another example, in response to only a partial region of the 3D display apparatus 300 being operated in a 3D mode, the 3D light source controller 333 may control a 3D light source located in the partial region operated in the 3D mode and a 3D light source located in the remaining region operated in the 2D mode based on different PWM values corresponding thereto.

Figure 7:
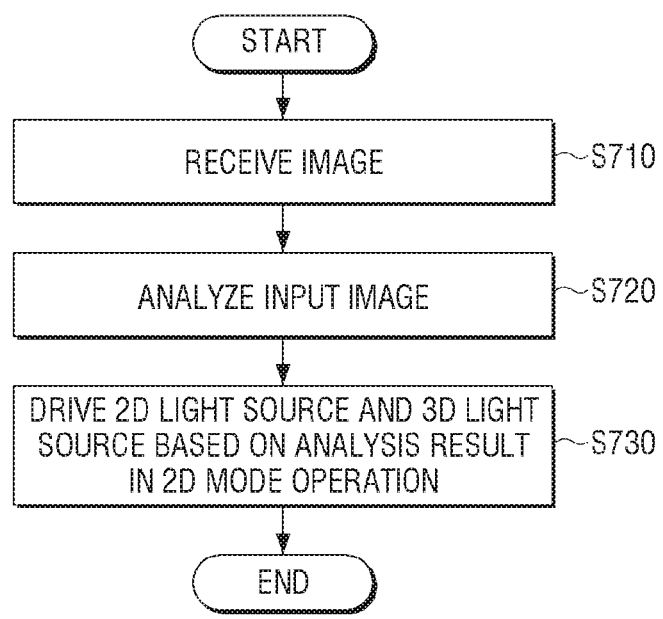
FIGS. 7 and 8 are flowcharts illustrating methods for driving a light source of an autostereoscopic 3D display apparatus according to an exemplary embodiment.

Hereinafter, light source driving methods of the autostereoscopic 3D display apparatus 200 will be described with reference to FIGS. 7 and 8. FIG. 7 is a flowchart schematically illustrating a light source driving method of the 3D display apparatus 200 according to an exemplary embodiment.

First, the 3D display apparatus 200 may receive an image (operation S710).

The 3D display apparatus 200 may analyze the input image (operation S720). The 3D display apparatus 200 may calculate a PWM value of the 2D light source 240 and a PWM value of the 3D light source 250 by analyzing brightness information of the input image.

In a 2D mode operation, the 3D display apparatus 200 may drive the 2D light source 240 and the 3D light source 250 based on the analysis result (operation S730). For example, in the 2D mode operation, the 3D display apparatus 200 may remove a pattern generated by the 3D light source 250 by driving both the 2D light source 240 and the 3D light source 250 based on the PWM values calculated based on the image analysis result.

Figure 8:
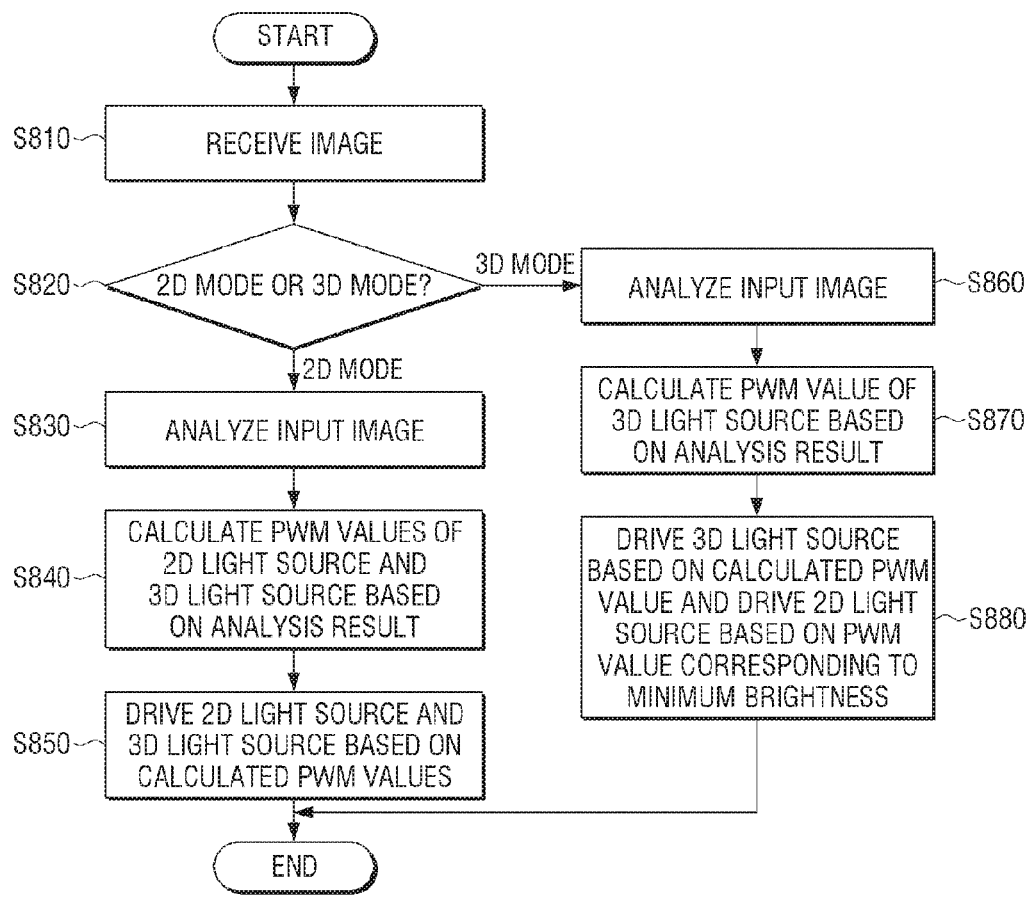

FIG. 8 is a flowchart illustrating a detailed light source driving method of the 3D display apparatus 200 according to an exemplary embodiment.

First, the 3D display apparatus 200 may receive an image (operation S810).

The 3D display apparatus 200 may determine whether a current mode of the 3D display apparatus 200 is a 2D mode or a 3D mode (operation S820).

In response to the current mode of the 3D display apparatus 200 being the 2D mode as a determination result in operation S820, the 3D display apparatus 200 may analyze the currently input image (operation S830). For example, the 3D display apparatus 200 may analyze brightness information (for example, an average of entire brightness, a histogram, brightness according to a region, and the like) of the input image.

The 3D display apparatus 200 may calculate a PWM value of the 2D light source 240 and a PWM value of the 3D light source 250 based on the analysis result (operation S840). For example, the 3D display apparatus 200 may calculate the PWM value of the 2D light source 240 corresponding to brightness of the input image, and the 3D display apparatus 200 may calculate the PWM value of the 3D light source unit 250 so that the brightness of the 3D light source may be synchronized with the brightness of the 2D light source 240 at an optimum ratio.

The 3D display apparatus 200 may drive the 2D light source 240 and the 3D light source 250 based on the calculated PWM values (operation S850).

In response to the current mode of the 3D display apparatus 200 being the 3D mode as a determination result in operation S820, the 3D display apparatus 200 may analyze the currently input image (operation S860).

The 3D display apparatus 200 may calculate a PWM value of the 3D light source 250 based on the analysis result (operation S870). For example, the 3D display apparatus 200 may calculate the PWM value of the 3D light source 250 corresponding to brightness of the input image.

The 3D display apparatus 200 may drive the 3D light source 250 based on the calculated PWM value and drive the 2D light source 240 based on a PWM value corresponding to minimum brightness (operation S880).

According to embodiments, the display apparatuses 200 and 300 may remove the degradation in picture quality caused in the 3D dimming-appeared region even in a 2D mode operation.

The above-described light source driving methods of a display apparatus according to various exemplary embodiments may be implemented in a program and provided to display apparatuses or input apparatuses. For example, the program including the light source driving methods of a display apparatus may be stored in a non-transitory computer-readable medium.

The non-transitory computer-recordable medium is not a medium configured to temporarily store data such as a register, a cache, or a memory but an apparatus-readable medium configured to permanently or semi-permanently store data. For example, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An autostereoscopic three-dimensional (3D) display apparatus comprising:
    an image receiver configured to receive an image;
    an image analyzer configured to analyze the image received by the image receiver;
    a two-dimensional (2D) light source configured to generate a 2D image;
    a 3D light source configured to generate a 3D image; and
    a controller configured to drive the 2D light source and the 3D light source based on the analyzed image,
    wherein
    the controller includes:
        a 2D light source controller configured to control the 2D light source; and
        a 3D light source controller configured to control the 3D light source,
    in a 2D operation mode, the image analyzer calculates a pulse width modulation (PWM) value for the 3D light source based on at least one of an average brightness and a histogram analysis of the received image, and
    in the 2D operation mode, the 3D light source controller drives the 3D light source based on the calculated PWM value for the 3D light source.

2. The autostereoscopic 3D display apparatus as claimed in claim 1, wherein the image analyzer calculates the PWM value based on a brightness ratio of the 2D light source and the 3D light source.

3. The autostereoscopic 3D display apparatus as claimed in claim 1, wherein
    the PWM value includes a plurality of PWM values,
    the image analyzer calculates each of the plurality of PWM values by analyzing a brightness value of a region in the received image, and
    the 3D light source controller drives the 3D light source based on the calculated PWM values for the regions.

4. The autostereoscopic 3D display apparatus as claimed in claim 1, wherein
    the image analyzer calculates a PWM value in which a brightness value output from the 2D light source is a minimum value to the 2D light source controller while the display apparatus is being operated in a 3D operation mode, and
    the 2D light source controller drives the 2D light source based on the PWM value calculated by the image analyzer.

5. The autostereoscopic 3D display apparatus as claimed in claim 1, wherein
    the image analyzer calculates, in response to only a partial region of the display apparatus being operated in a 3D mode, a PWM value for the partial region and a PWM value for the remaining region other than the partial region to be different from each other, and
    the 3D light source controller drives the 3D light source based on the PWM value for the partial region and the PWM value for the remaining region.

6. The autostereoscopic 3D display apparatus as claimed in claim 1, wherein the controller acquires brightness parameter information set by a user, and drives the 2D light source and the 3D light source based on the analyzed image and the acquired brightness parameter information.

7. The autostereoscopic 3D display apparatus as claimed in claim 1, wherein
    the 3D light source includes a vertical light source, and
    the 2D light source includes at least one of a horizontal light source and a direct light source.

8. A method for driving a light source of an autostereoscopic three-dimensional (3D) display apparatus including a two-dimensional (2D) light source configured to generate a 2D image and a 3D light source configured to generate a 3D image, the method comprising:
    receiving an image;
    analyzing the received image; and
    driving, by a hardware controller, the 2D light source and the 3D light source based on the analyzed image,
    wherein
    in a 2D operation mode, the analyzing includes calculating a pulse width modulation (PWM) value for the 3D light source based on at least one of an average brightness and a histogram analysis of the received image, and
    in a 2D operation mode, the driving includes driving the 3D light source based on the calculated PWM value for the 3D light source.

9. The method as claimed in claim 8, wherein the analyzing includes calculating the PWM value based on a brightness ratio of the 2D light source and the 3D light source.

10. The method as claimed in claim 8, wherein
the PWM value includes a plurality of PWM values,
the analyzing includes calculating each of the plurality of PWM values by analyzing a brightness value of a region in the received image, and
the driving includes driving the 3D light source based on the calculated PWM values for the regions.

11. The method as claimed in claim 8, wherein
the analyzing includes calculating a PWM value in which a brightness value output from the 2D light source is a minimum value while the display apparatus is being operated in a 3D operation mode, and
the driving includes driving the 2D light source based on the PWM value.

12. The method as claimed in claim 8, wherein
the analyzing includes calculating, in response to only a partial region of the display apparatus being operated in a 3D mode, a PWM value for the partial region and a PWM value for the remaining region other than the partial region to be different from each other, and
the driving includes driving the 3D light source based on the PWM value for the partial region and the PWM value for the remaining region.

13. The method as claimed in claim 8, further comprising acquiring brightness parameter information set by a user,
wherein the driving includes driving the 2D light source and the 3D light source based on the analyzed image and the acquired brightness parameter information.

14. The method as claimed in claim 8, wherein
the 3D light source includes a vertical light source, and
the 2D light source includes at least one of a horizontal light source and a direct light source.

* * * * *